United States Patent
Poulson

[11] Patent Number: 5,979,967
[45] Date of Patent: *Nov. 9, 1999

[54] AUXILIARY SUN VISOR FOR MOTOR VEHICLES

[76] Inventor: Thomas C. Poulson, 1420 Quince St., Denver, Colo. 80220

[*] Notice: Under 35 U.S.C. 154(b), the term of this patent shall be extended for 525 days.

[21] Appl. No.: 08/505,853

[22] Filed: Jul. 24, 1995

Related U.S. Application Data

[66] Substitute for application No. 08/209,941, Mar. 11, 1994, abandoned.

[51] Int. Cl.$^6$ ....................................................... B60J 3/00
[52] U.S. Cl. .......................................... 296/97.9; 296/97.5
[58] Field of Search ................................ 296/97.1, 97.5, 296/97.6, 97.7, 97.9, 97.13; 160/DIG. 2, DIG. 3, 370.2 R; 224/312, 901.2, 901.8

[56] References Cited

U.S. PATENT DOCUMENTS

| | | | |
|---|---|---|---|
| 2,163,495 | 6/1939 | Levy | 296/97.5 |
| 2,549,395 | 4/1951 | Short, Sr. | 296/97.9 X |
| 2,620,222 | 12/1952 | Beauchamp | 296/97.6 |
| 2,922,676 | 1/1960 | Czajkowski | 296/97.8 |
| 3,704,844 | 12/1972 | Wolf | 296/97.8 |
| 3,940,180 | 2/1976 | Altschul . | |
| 4,096,589 | 6/1978 | Goldstein | 2/12 |
| 4,353,593 | 10/1982 | Henson . | |
| 4,363,512 | 12/1982 | Marcus . | |
| 4,477,116 | 10/1984 | Viertel et al. | 296/97.1 |
| 4,570,991 | 2/1986 | Lystad | 296/97.8 |
| 4,792,176 | 12/1988 | Karford | 296/97.8 |
| 4,861,091 | 8/1989 | Wallen | 296/97.6 |
| 4,940,273 | 7/1990 | Konishi | 296/97.6 |
| 4,958,879 | 9/1990 | Gillum | 296/97.6 |
| 4,964,508 | 10/1990 | Balsley | 224/901.8 X |
| 5,190,197 | 3/1993 | Novak | 224/312 |
| 5,477,629 | 12/1995 | Gleason, Jr. | 40/329 |
| 5,509,713 | 4/1996 | Hou | 296/138 |

*Primary Examiner*—Dennis H. Pedder
*Attorney, Agent, or Firm*—John E. Reilly

[57] ABSTRACT

An auxiliary sun visor is in the form of an oblong panel which is placed in front of a rear view mirror to bridge the space between the standard sun visors of a motor vehicle, and complementary fastening members on one surface of the panel and the front surface of the rear view mirror to releasably attach the panel to the rear view mirror.

11 Claims, 1 Drawing Sheet

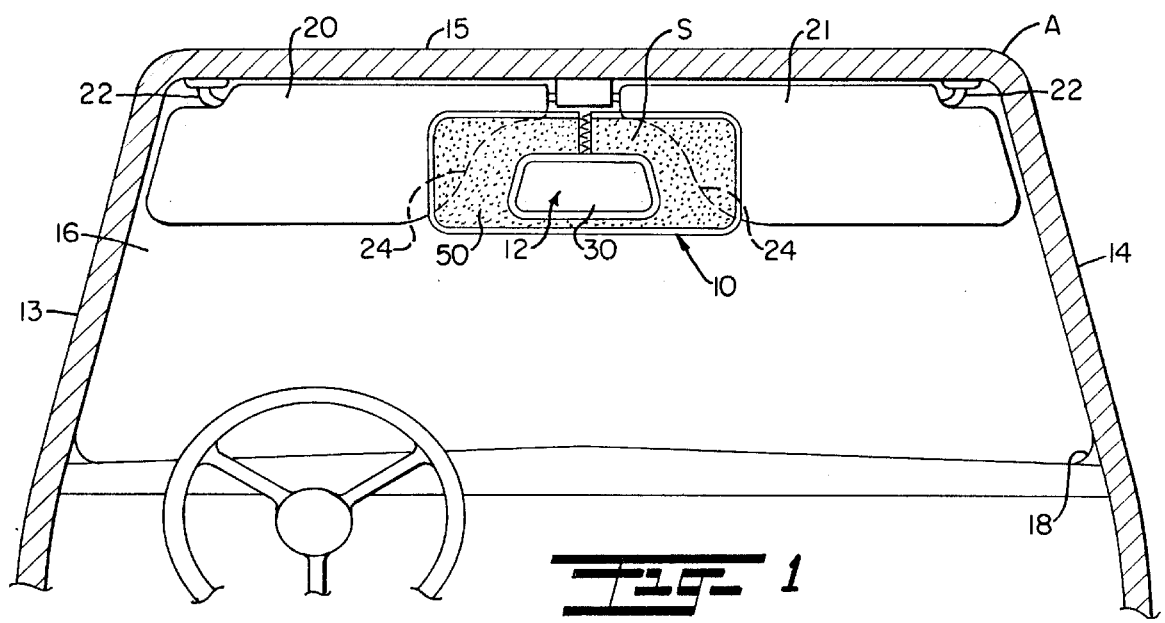
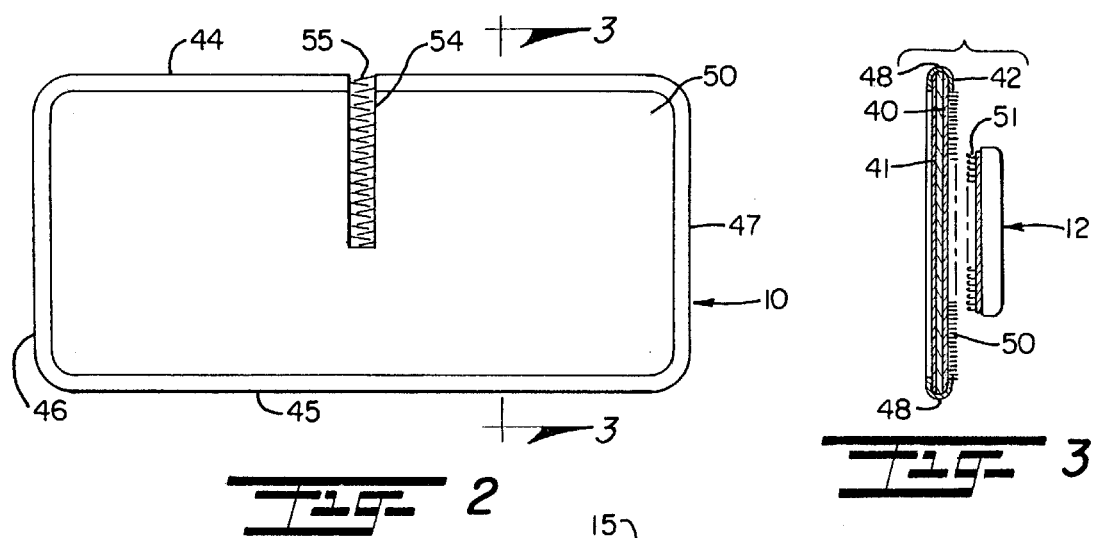
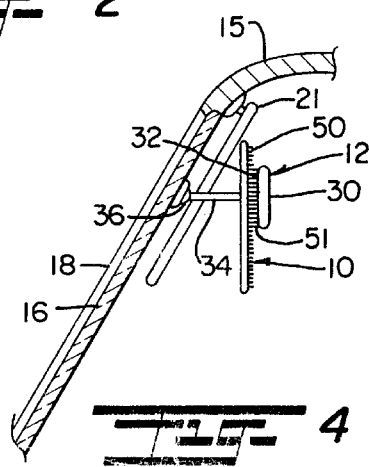

AUXILIARY SUN VISOR FOR MOTOR VEHICLES

This is a substitute application of U.S. Patent Application Ser. No. 08/209,941, filed Mar. 11, 1994, now abandoned.

BACKGROUND AND FIELD OF INVENTION

This invention relates to sun visors for motor vehicles; and more particularly relates to a novel and improved auxiliary sun visor which can be releasably attached to a rear view mirror to bridge the gap between the existing, spaced sun visors on the passenger and occupant sides of the windshield area of a motor vehicle.

Traditionally, motor vehicles are equipped with adjustable sun visors which are mounted on the upper portion of the windshield frame for extension across the windshield area on either side of the rear view mirror. However, the conventional sun visors when moved into position across the windshield area leave an undesirable space or gap in the area surrounding the rear view mirror so that when the sun is at a particular attitude with respect to the windshield is not adequately shielded from the driver. Various approaches have been taken in the past to alleviate this problem and, for example, U.S. Pat. No. 2,549,395 to C. A. Short, Sr. discloses a rectangular panel having a narrow slot with circular apertures along the slot to facilitate attachment of the panel onto the attaching stud of the rear view mirror so that the panel will effectively bridge the gap between the existing sun visors. U.S. Pat. No. 4,958,879 to J. H. Gillum is directed to a sun visor which can be folded along its center and has a slot to fit over the rear view mirror with the panel located behind the mirror. U.S. Pat. No. 2,163,459 to S. M. Levy discloses extensions or wings which can swing in a vertical plane between the existing rear view mirror and the windshield. U.S. Pat. No. 4,353,593 to A. R. Henson discloses a system of sun visors that can be mounted at different locations in an automobile by means of Velcro or hook/loop fastening elements but requires that the fastening elements be placed at different selected locations in a manner such that the visor attachments may be utilized or stored at or adjacent to each of those locations. Other representative patents are U.S. Pat. Nos. 2,620,222 to M. E. Beauchamp, 3,940,180 to L. T. Altschul, 4,363,512 to K. H. Marcus, 4,477,116 to L. Viertel et al., 4,570,991 to L. A. Lystad, 4,792,176 to F. Karford, 4,861,091 to R. J. Wallen and 4,940,273 to M. Konishi.

From the foregoing, there is a need for an auxiliary sun visor which can be more firmly but releasably attached to the broader surface area of the rear view mirror itself for extension across the gap between the existing sun visors. By providing a broad surface area of attachment not only is the panel easier to attach and remove but also can be made of a flexible material which will more readily conform to varying degrees of curvature or contour of various windshield constructions and yet most effectively bridge the gap between the visors; and further can be readily removed from the rear view mirror and stored in a compact condition so as to occupy a minimum of space in the vehicle.

SUMMARY OF INVENTION

It is therefore an object of this invention to provide for a novel and improved auxiliary sun visor adaptable for use with existing standard sun visors across the windshield area of the vehicle.

It is another object of the present invention to provide for an auxiliary sun visor of simplified construction and which is capable of blocking the passage of light through the space between existing sun visors of the motor vehicle in a highly simplified but reliable manner.

It is a further object of the present invention to provide for a novel and improved auxiliary sun visor which is adaptable for releasable attachment to the rear view mirror of a vehicle in such a way as to insure against accidental slippage or disconnection but nevertheless may be adjustably secured in a position to most effectively block the passage of sun's rays through the gap between existing sun visors.

It is a still further object of the present invention to provide for a novel and improved auxiliary sun visor which is readily conformable for use on virtually any type of rear view mirror and will readily conform to different windshield contours for virtually universal application to different types of motor vehicles.

In accordance with the foregoing and other objects and features of the present invention, there has been devised an auxiliary sun visor for use in automobiles, trucks and other vehicles of the type having a rear view mirror which is attached to the windshield frame intermediately between spaced sun visors of the type which are adjustable into position over an upper portion of the windshield, and wherein the rear view mirror has a rearwardly facing mirror surface and front surface in spaced facing relation to the windshield, the auxiliary visor comprising in combination therewith a flat oblong panel and complementary attaching means between one surface of the panel and the front surface of the rear view mirror for releasably attaching the panel to the mirror whereby the panel extends across the space between the spaced sun visors to effectively block the passage of light through the space.

The panel may be composed of various materials which are capable of blocking or substantially reducing the passage of light through the space immediately surrounding the rear view mirror; and in the preferred form preferably comprises a panel of flexible construction which is sized to traverse the entire space between the existing sun visors. In order to permit utilization of a panel of flexible construction, the attaching means are applied to the entire front surface of the rear view mirror and over a broad surface of the panel, such as, fastener elements of the hook-and-loop type commonly referred to as "VELCRO"® in order to lend sufficient support to the panel and so that the sides of the panel extending beyond the rear view mirror surface will not tend to collapse or fold downwardly from the rear view mirror.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a view in elevation from the interior of the vehicle illustrating the preferred form of sun visor in attached position with respect to a rear view mirror;

FIG. 2 is a front view in elevation and enlarged of the preferred form of auxiliary sun visor in accordance with the present invention;

FIG. 3 is a cross-sectional view taken about lines 3—3 of FIG. 2; and

FIG. 4 is a cross-sectional view taken through the windshield area of a vehicle and illustrating the auxiliary sun visor of the present invention in attached position with respect to the rear view mirror.

DETAILED DESCRIPTION OF PREFERRED EMBODIMENT

Referring in more detail to the drawings, there is shown by way of illustrative example in FIG. 1 the mounting and disposition of a preferred form of auxiliary sun visor 10 in relation to a conventional form of rear view mirror 12. As a setting for the present invention, FIG. 1 illustrates this mounting from the rear interior of a standard automobile A having opposite sides 13, 14 and a roof 15. A windshield 16 is mounted within a standard windshield molding or frame 18, and a pair of standard sun visors 20 and 21 each is adjustably mounted on a rod 22 which is affixed to the headliner on the interior of the roof section of the vehicle. In accordance with well-known practice, the sun visors 20 and 21 are pivotal between an upper storage position and a downwardly extending position, as shown, across the upper portion of the windshield 16 on the driver's side and occupant's side of the vehicle. In order to avoid contact with the rear view mirror, each of the visors 21 and 22 has an inner confronting edge 24 terminating short of the rear view mirror 12 so as to leave a gap or space as represented in speckled form at S between the edges 24 when the visors are disposed in operative position across the upper portion of the windshield 16.

As further seen from a consideration of FIGS. 1 and 4, the standard rear view mirror 12 is comprised of a rearwardly directed mirror surface 30 of elongated generally rectangular configuration and a correspondingly sized front surface 32 facing the windshield area 16. An attaching arm or post 34 extends forwardly from the mirror 12 to terminate in a swivel end 36 which is affixed within a socket portion 38 on the windshield 16. Again, this is merely representative of different rear view mirror constructions and, for example, in many cases the post 34 is affixed above the windshield area. In addition, although the front surface 32 is illustrated as being relatively flat, it may assume various different curved configurations and particularly in those rear view mirrors which house optical control systems to reduce the glare from oncoming lights of another vehicle.

The preferred form of auxiliary sun visor 10 is of elongated generally rectangular configuration having an inner layer 40 sandwiched between outer cover layers 41 and 42 and joined along opposed upper and lower longitudinal edges 44, 45 and opposite ends 46, 47 to form a unitary panel member. One suitable procedure for joining along their outer peripheral edges is by means of a cover strip 48 folded over and stitched to the layers 40, 41 and 42. An open slot 54 extends from the longitudinal edge 44 transversely across the visor 10 at a location intermediately between the ends 46 and 47. Preferably, the slot 54 extends over a distance just greater than one-half of the width of the panel. The slot itself is sized to be of a width to permit easy clearance of the arm or post 34 on the rear view mirror 12 when the panel is passed upwardly into position in front of the rear view mirror, as illustrated in FIG. 1. A suitable fringe or brush-like material 55 is secured along opposite side edges of the slot 54. It will be apparent that the width of the slot 54 may be varied according to different widths and sizes of mirror support arms 34 for mounting of the rear view mirror, or the slot may be dispensed with when used with mirrors in which the support arms would not interfere with placement of the visor 10 on the front surface.

In order to releasably secure the panel defining the visor 10 to the front surface of the rear view mirror 12, the layer 42 is covered with one surface of a complementary fastening system, commonly referred to as "VELCRO®" with the loop portion as represented at 44 forming a unitary part of the layer 42. The complementary fastening surface comprises a hook layer 46 which is affixed to and covers the front surface 32 of the rear view mirror 12. Preferably, the hook fastening surface 51 is adhered to the front surface 32 by a bonding agent which will permanently secure the fastening surface 51 to the mirror surface.

In a preferred construction of the visor 10, the inner layer 40 may be composed of a suitable heavy paper or plastic material which has at least limited flexibility but will act as a stiffener as well; the outer cover layers 41, 42 and 48 may be composed of a Nylon as well as various natural or synthetic fabric or fabric-like materials. The cover layer 42 is preferably formed such that the loop-type fastening surface 50 forms a unitary part of the cover layer. In the construction as described, the visor is sufficiently flexible that it may be folded or rolled up when not in use, or if desired may simply lay flat on the dashboard in the glove compartment or on a seat of the vehicle. It will of course be apparent that the visor may simply consist of a single layer of material having a VELCRO®-like or other suitable fastening member along at least a portion of one surface which can be affixed to the front surface of the mirror. Other types of fastening elements may be provided in place of the VELCRO® or other hook-and-loop fastening systems to releasably secure the visor to the rear surface of the mirror but most desirably should utilize the broader surface area of the mirror to effectively anchor the visor against shifting or movement once fastened to the mirror.

In use, the visor 10 is passed upwardly in front of the mirror 12 with the slot 54 receiving the arm 34 until the visor is in a position effectively bridging the gap or space between the existing visors 20 and 21. Pressure is applied to the visor forcing the loop-type fastener surface 50 firmly against the hook-type fastener surface 51 on the mirror 12 to firmly anchor the visor 10 in position. Preferably, the visor 10 is dimensioned so that the ends 46 and 47 extend slightly beyond the ends of the visors 20 and 21, as illustrated in FIG. 1, and to some extent will be supported by the inner ends 24 against any tendency to droop or sag at their free ends 46 and 47. It should be emphasized, however, that the relatively broad fastening surface area between the surfaces 50 and 51 when combined with the stiffening properties of the inner layer 40 will effectively discourage any tendency of the visor to sag or droop and avoid any need for fastening clips between the auxiliary visor 10 and the visors 20 and 21. Thus, it is not necessary that both visors 20 and 21 be lowered into position over the windshield in order to support the auxiliary visor 10 in position. The visor 10 can be easily removed from the mirror simply by peeling the fastening surface 50 away from the surface 51 on the mirror and placed either on the dashboard, seat or glove compartment as described.

It is therefore to be understood from the foregoing description of a preferred form of present invention that various modifications and changes may be made in the construction and arrangement of parts and materials comprising the auxiliary visor without departing from the spirit and scope of the present invention as defined by the appended claims and reasonable equivalents thereof.

I claim:

1. In a motor vehicle wherein a rear view mirror is attached to the interior of a windshield area intermediately between a pair of spaced sun visors on said windshield and includes a rearwardly facing mirror surface and a front surface in spaced facing relation to the windshield, the combination therewith comprising:

an auxiliary sun visor in the form of a substantially flat flexible panel; and complementary attaching means substantially covering one broad surface of said panel and substantially covering the entire said front surface of said rear view mirror for adjustably securing said panel to at least a portion of the front surface of said rear view mirror whereby said panel is flexibly conformable to the configuration of said front surface to adjustably secure said panel in a position in a space between said sun visors.

2. In a motor vehicle according to claim 1 wherein said rear view mirror includes an arm attaching said rear view mirror to said windshield frame, said panel having an intermediate slot extending transversely from one longitudinal edge of said panel for insertion of said attaching arm when said panel is attached to said front surface of said rear view mirror.

3. In a motor vehicle according to claim 1, said panel being composed of a flexible material and being of a length to traverse the space between said sun visors.

4. In a motor vehicle according to claim 1 wherein said panel overlaps said sun visors at opposite ends thereof.

5. In a motor vehicle according to claim 1 wherein said complementary attaching means comprise hook-and-loop fastener elements between said panel and said front surface of said mirror.

6. In a motor vehicle according to claim 5, wherein said complementary attaching means includes loop-type fastener elements on a rear surface of said panel and hook-type fastener elements substantially covering said front surface of said rear view mirror.

7. An auxiliary sun visor attachment system for a motor vehicle wherein a rear view mirror includes an arm attached to the interior of a windshield frame intermediately between a pair of spaced sun visors on said windshield frame and includes a rearwardly facing mirror surface and a front surface in spaced facing relation to the windshield, said auxiliary sun visor being in the form of a flexible flat oblong panel conformable to the configuration of said front surface and having an intermediate slot extending transversely from one longitudinal edge of said panel for insertion of said attaching arm when said panel is attached to said front surface of said rear view mirror, said panel being of a width substantially corresponding to that of said spaced sun visors and of a length overlapping inner facing ends of said spaced sun visors; and complementary attaching means for substantially covering one broad surface of said panel and for covering the entire said front surface of said rear view mirror for releasably attaching said panel to said front surface of said rear view mirror whereby said complementary attaching means provide a broad fastening surface area between said broad surface and said front surface, and said panel is adjustably extendible in a desired direction away from said rear view mirror across a space between said spaced sun visors to block the passage of sunlight past said panel.

8. In an auxiliary sun visor in a motor vehicle according to claim 7, said panel being composed of a flexible material and being of a length to traverse the space between said spaced sun visors.

9. In an auxiliary sun visor in a motor vehicle according to claim 8 wherein said panel has an inner stiffening member of limited flexibility and a cover on one surface of said panel defining a portion of said attaching means.

10. In an auxiliary sun visor in a motor vehicle according to claim 7, said complementary attaching means comprising hook-and-loop fastener elements between said panel and said front surface of said mirror.

11. In an auxiliary sun visor in a motor vehicle mirror according to claim 10, wherein said complementary attaching means includes loop-type fastener elements covering a rear surface of said panel and hook-type fastener elements for covering said front surface of said rear view mirror.

\* \* \* \* \*